(12) United States Patent
Seo et al.

(10) Patent No.: US 12,236,045 B2
(45) Date of Patent: Feb. 25, 2025

(54) OBJECT POSITION DETECTION APPARATUS

(71) Applicant: HYUNDAI MOBIS CO., LTD., Seoul (KR)

(72) Inventors: Jun Seong Seo, Yongin-si (KR); Sung Hyun Park, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/513,758

(22) Filed: Nov. 20, 2023

(65) Prior Publication Data

US 2024/0256087 A1 Aug. 1, 2024

(30) Foreign Application Priority Data

Feb. 1, 2023 (KR) .................. 10-2023-0013474

(51) Int. Cl.
*G06F 3/042* (2006.01)
*G01S 7/481* (2006.01)

(52) U.S. Cl.
CPC .......... *G06F 3/0421* (2013.01); *G01S 7/4811* (2013.01)

(58) Field of Classification Search
CPC .............................. G01S 7/4811; G06F 3/0421
USPC ......................................................... 345/173
See application file for complete search history.

(56) References Cited

U.S. PATENT DOCUMENTS

| 2013/0203941 | A1* | 8/2013 | Katami | C09J 133/14 526/264 |
| 2017/0277323 | A1 | 9/2017 | Kim et al. | |
| 2018/0373370 | A1* | 12/2018 | Jung | H04M 1/22 |
| 2019/0324593 | A1 | 10/2019 | Chung et al. | |

FOREIGN PATENT DOCUMENTS

| EP | 3239813 A1 | 11/2017 |
| KR | 10-1080512 B1 | 11/2011 |
| KR | 10-2125756 B1 | 6/2020 |

OTHER PUBLICATIONS

Extended European Search Report issued on May 17, 2024 in corresponding European Patent Application No. 23210611.2.

\* cited by examiner

*Primary Examiner* — Calvin C Ma
(74) *Attorney, Agent, or Firm* — NovoTechIP International PLLC

(57) ABSTRACT

Disclosed is an object position detection apparatus. A position detection apparatus according to an embodiment of the present disclosure may include a display unit configured to display information, a sensor unit located below the display unit and configured to detect a position of an object approaching the screen, and a cover glass member covering a front side of the display unit and sensor unit, wherein the sensor unit may include an adhesive conjoining the sensor unit and the cover glass member.

14 Claims, 10 Drawing Sheets

<Section A – A'>

OBJECT POSITION DETECTION APPARATUS

CROSS-REFERENCE TO RELATED APPLICATIONS

This application is based on and claims priority under 35 U.S.C. 119 to Korean Patent Application No. 10-2023-0013474, filed on Feb. 1, 2023, in the Korean Intellectual Property Office, the disclosure of which is herein incorporated by reference in its entirety.

TECHNICAL FIELD

The present disclosure relates to an object position detection apparatus and, more particularly, to an object position detection apparatus provided at the bottom of a display.

BACKGROUND

Optical sensor technology is a technology in which a light-emitting unit emits light and in which a receiving unit detects a signal according to reflection of the light, thereby tracking directions or coordinates. Recently, a technology has been developed to detect the position of an object by generating light and measuring the time taken for the light to be reflected and then return. The position of a person's finger pointing at a position adjacent to a display screen may be measured by applying this technology, thereby implementing a technology such as popping up a menu in an area pointed by a user's finger and the like.

Although a general optical sensor protects the inside thereof using a light-transmitting material cover such as polycarbonate (PC) on the front surface to protect an internal sensor, it is less rigid than a cover glass member of the display screen and disparate from the upper display screen.

In addition, the configuration in which the cover glass member of the display screen extends downward to cover an optical sensor may result in an increase in the size of the cover glass member compared to the area of the display screen actually used, thereby lowering the design quality.

Therefore, in this technical field, there is a need for an optical sensor technology capable of protecting the sensor at the bottom of the display while minimizing an increase in the size of the cover glass member even if the display cover glass member is configured to extend downward to cover the optical sensor.

SUMMARY

An aspect of the present disclosure is to provide an object position detection apparatus capable of protecting a sensor at the bottom of a display while minimizing an increase in the size of the cover glass member even if the display cover glass member is configured to extend downward to cover an optical sensor.

Another aspect of the present disclosure is to provide an object position detection apparatus capable of securing the rigidity of a proximity sensor module by replacing an assembly screw with a double-sided tape.

Another aspect of the present disclosure is to provide an object position detection apparatus capable of providing a sense of unity with the upper display screen in appearance.

Another aspect of the present disclosure is to provide an object position detection apparatus capable of securing luxurious design.

In view of the foregoing, a position detection apparatus according to an embodiment of the present disclosure may include a display unit configured to display information, a sensor unit located below the display unit and configured to detect a position of an object approaching the screen, and a cover glass member covering front side of the display unit and sensor unit, wherein the sensor unit may include an adhesive conjoining the sensor unit and the cover glass member.

In this case, the sensor unit may further include one or more lenses configured to refract (1) reference light emitted from one or more light-emitting elements and (2) the reference light reflected by the object and returning to the light-receiving element.

In this case, the cover glass member may extend downward from the display unit and cover the entirety of the one or more lenses and adhesive.

In this case, a number of the one or more lenses disposed on a movement path of the reference light and the reflected reference light is the same as a number of the one or more light-emitting elements and a number of the one or more light-receiving elements may be disposed on movement paths of the reference light and the reflected reference light.

In this case, the one or more lenses may comprise a plurality of lenses, and the adhesive may at least partially occupy a space between the plurality of lenses.

In this case, the position detection apparatus may further include a panel having a storage space at which the display unit and the sensor unit may be disposed.

In this case, the panel may protrude to be flat with respect to the cover glass member.

In this case, the cover glass member may have a surface extending below the lens and covering a portion of the panel.

In this case, the panel may have a step that is shaped to engage the extending surface of the cover glass member to collectively form a flat surface.

In this case, the adhesive may cover a contact surface between the cover glass member and the panel.

In this case, the cover glass member may extend vertically and have a size covering only the lens.

In this case, the adhesive may comprise a double-sided tape.

In this case, the adhesive may comprise a transparent material and entirely cover lens.

In this case, the cover glass member may comprise a transparent material.

According to various embodiments of the present disclosure as described above, even if the display cover glass member is configured to extend downward to cover an optical sensor, it is possible to protect the sensor at the bottom of the display while minimizing an increase in the size of the cover glass member.

In addition, it is possible to secure the rigidity of a proximity sensor module by replacing an assembly screw with a double-sided tape.

In addition, it is possible to provide a sense of unity with an upper display screen in appearance.

In addition, it is possible to secure luxurious design.

Advantageous effects obtainable from the present disclosure may not be limited to the above-mentioned effects, and other effects which are not mentioned may be clearly understood, through the following descriptions, by those skilled in the art to which the present disclosure pertains.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Hereinafter, embodiments disclosed in the present specification will be described in detail with reference to the accompanying drawings, and the same or similar elements are given the same and similar reference numerals, so duplicate descriptions thereof will be omitted. The terms "module" and "unit" used for the elements in the following description are given or interchangeably used in consideration of only the ease of writing the specification, and do not have distinct meanings or roles by themselves. Furthermore, in describing the embodiments disclosed in the present specification, when the detailed description of the relevant known technology is determined to unnecessarily obscure the gist of the present disclosure, the detailed description may be omitted. Furthermore, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Figure 1:
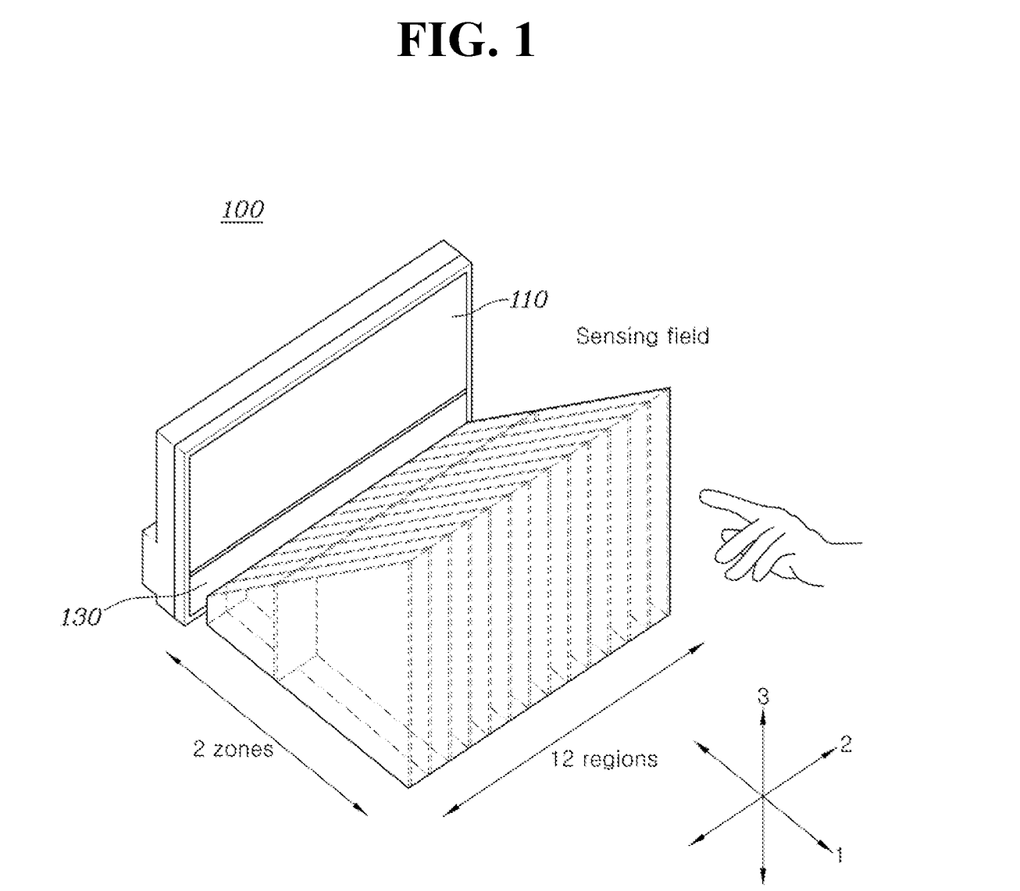
FIG. 1 illustrates a position detection apparatus according to an embodiment of the present disclosure.

FIG. 1 illustrates a position detection apparatus according to an embodiment of the present disclosure.

Referring to FIG. 1, a position detection apparatus 100 according to this embodiment may include a display unit 110 and a sensor unit 130.

The display unit 110 displays information on a screen.

For example, the display unit 110 may have a rectangular display area having a major axis direction extending in one axis (here, the second axis) and a minor axis direction extending in another axis direction (here, the third axis) that intersects the one axis, but this is an example and the display unit is not necessarily limited thereto. For example, the shape of the display area may be a polygon, a circle, or an ellipse, instead of a rectangle, and the major axis direction and the minor axis direction may be interchanged, or the display area may have a square shape without distinction between the major axis and the minor axis.

In addition, the display unit 110 may be a display screen of an audio, video, and navigation (AVN) system disposed between a driver's seat and a passenger seat in a vehicle. For example, the display unit 110 may display a multimedia playback screen, a navigation screen for providing a direction to a driver in a vehicle, a user interface for setting various vehicle functions, and the like.

In addition, the display unit 110 may be formed in a layered or integral structure with touch sensor, thereby implementing a touch screen. Such a touch screen may function as a user input unit providing an input interface to a user and may provide an output interface to the user.

The display unit 110 may be configured as at least one of a liquid crystal display (LCD), a thin-film transistor liquid crystal display (TFT LCD), an organic light-emitting diode (OLED), a flexible display, a 3D display, and an e-ink display, but this is only an example and the display unit 110 is not necessarily limited thereto.

The sensor unit 130 extends along one direction (here, the second-axis direction) in which the display unit 110 extends and is disposed side by side with the display unit 110 to detect an object approaching the display unit 110, the position and movement thereof, and the like. The sensor unit 130 may be referred to as a "linear sensor" according to its shape.

The linear sensor 130 includes at least one light-emitting means arranged linearly and a plurality of light-receiving means arranged linearly.

In this case, if an object, for example, a finger (hereinafter, an object to be detected is assumed to be a finger for convenience of description) approaches the display unit 110 located above the linear sensor 130, the linear sensor 130 may detect the finger approaching the display unit 110 using the principle in which light (e.g., an infrared ray) emitted from the light-emitting means is reflected by the finger and then detected by the light-receiving means. The detailed arrangement of the light-emitting means and the light-receiving means will be described later with reference to FIG. 3.

The linear sensor 130 may be provided to be separated from and spaced apart from the display unit 110, or may be disposed to be in contact with the bottom of the display unit 110 as shown in FIG. 1, or may be configured as an embedded type so as to be hidden behind, for example, the rear surface of a cover glass member covering the screen of the display unit 110.

Meanwhile, the light-emitting means may be disposed such that a sensing area (i.e., a sensing field) of the linear sensor 130 is formed within a predetermined area in front of the screen of the display unit 110. That is, the light-emitting means may be disposed such that the light-emitting direction thereof includes at least the first-axis direction. In addition, in the case where the light emission pattern of the light-emitting means is a fan-shaped diffusion pattern, the sensing field may expand more along the third axis as it is farther from the screen of the display unit 110 to the front thereof. In addition, the sensing field may be divided into a plurality of zones according to the range of distance from the screen of the display unit 110 to the front of the screen of the display unit 110, that is, along the first-axis direction, and may be divided into a plurality of regions along one extension direction (here, the second-axis direction) of the display unit 110. For example, the sensing field may be divided into 2 zones along the first-axis direction and 12 regions along the second-axis direction, but this is illustrative, and the sensing field is not necessarily limited thereto. In addition, the size of the sensing field may be variously set according to depending on the light intensity of the light-emitting means, a radiation angle when emitting light, the light-receiving sensitivity of the light-receiving means, the arrangement pattern or number of light-emitting means and light-receiving means, and the like.

The position detection apparatus 100 according to the embodiment, compared to a general position detection apparatus in which a sensing field is provided perpendicular to the display screen, is able to detect a finger approaching the front of the display unit 110 from a relatively long distance, as well as a finger adjacent to the display unit 110, because the sensing field of the linear sensor 130 expands more as it is farther from the screen of the display unit 110 to the front thereof as described above.

Figure 2:
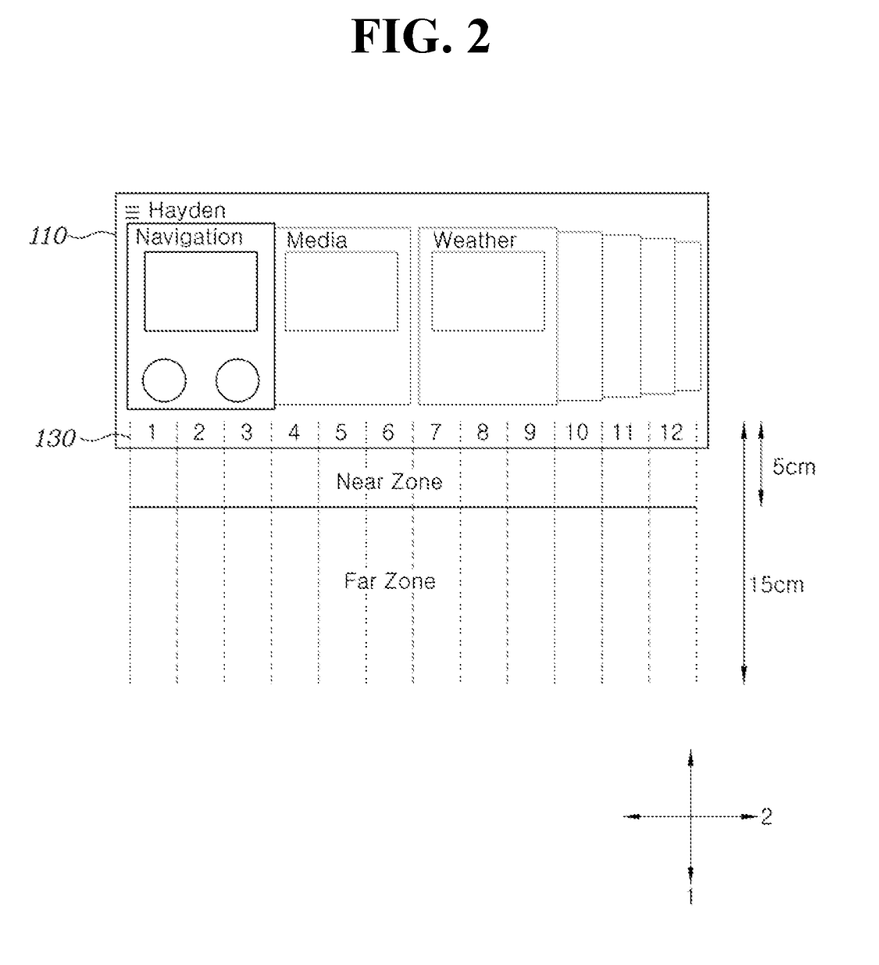
FIG. 2 illustrates an example of a sensing area of a display unit of the position detection apparatus in FIG. 1.

FIG. 2 illustrates an example of a sensing area of a display unit of the position detection apparatus shown in FIG. 1.

Referring to FIG. 2, the sensing area of the linear sensor 130 may include 12 regions along the second-axis direction. As described above, the number of sensing areas may vary depending on the configuration of the light-emitting means and the light-receiving means constituting the linear sensor 130.

The position detection apparatus 100 may detect the region to which a finger approaching the display unit 110 belongs and provide or change a user interface (e.g., a pop-up of a detailed menu, information display, etc.) through the display unit 110 in response to the detected region. For example, as shown in FIG. 2, the sensing area may include 12 regions, i.e., a first region to a twelfth region, from left to right along the second-axis direction. Here, the position detection apparatus 100 may execute (or enlarge/activate/display a pop-up) a navigation menu when a finger is located in the first to third regions, execute a media menu when the finger is located in the fourth to sixth regions, and execute a weather menu when the finger is located in the seventh to ninth regions.

In addition, the position detection apparatus 100 may measure the degree of proximity of a finger to the linear sensor 130 on the basis of the receiving-light intensity, and for example, there may be 2 zones, that is, a near zone in the case where the finger approaches within 5 cm from the linear sensor 130 and a far zone in the case where the finger approaches 5 cm or more and within 15 cm from the linear sensor 130. In this case, the position detection apparatus 100 may be configured to perform different operations depending on the cases where the finger is located in the near zone and where the finger is located in the far area. For example, the position detection apparatus 100 may be configured to emphasize and display a selected menu on the display screen to give visual effects such as enlarging/changing color when the finger is located in the far area, and execute the selected menu when the finger is located in the near zone.

In addition, although not shown, the position detection apparatus 100 may change the arrangement state of the menu depending on the region where the finger is first detected. For example, if the finger is first detected in the first region, menus may be provided to be concentrated on the left side, and if the finger is first detected in the twelfth region, menus may be provided to be concentrated on the right side.

Figure 3:
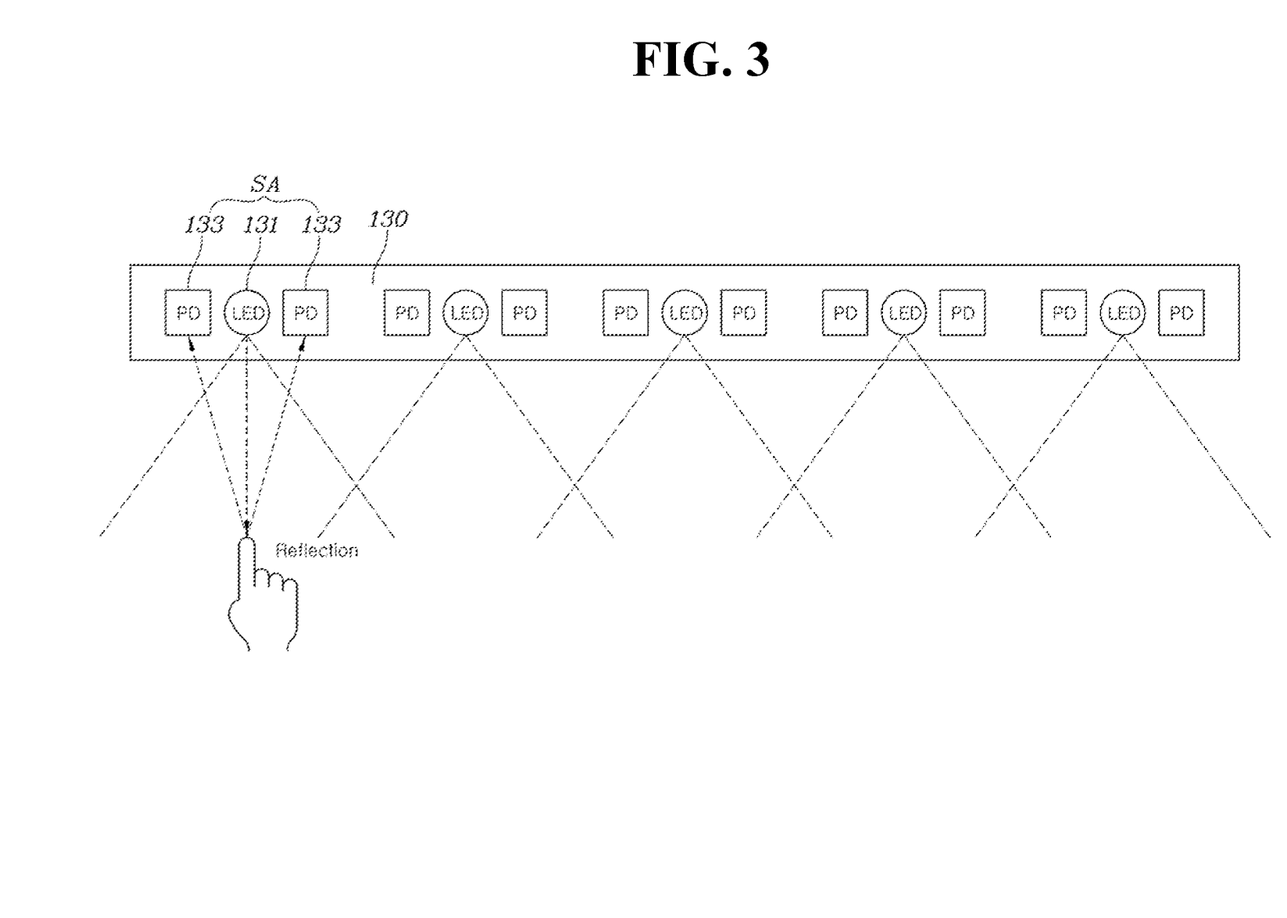
FIG. 3 illustrates a linear sensor module according to an embodiment of the present disclosure.

FIG. 3 illustrates a linear sensor module according to an embodiment of the present disclosure.

Referring to FIG. 3, the linear sensor module 130 according to the present disclosure may have configuration in which sensor arrays SA including a light-emitting element 131 and a light-receiving element 133 are spaced apart a predetermined distance from each other along one direction. For example, as shown in FIG. 3, the sensor array SA may have an arrangement pattern in which the light-emitting element 131 is disposed at the center and in which the light-receiving elements 133 are disposed on both sides of the light-emitting element 131, respectively, but this is only an example, and the sensor array is not necessarily limited thereto.

The light-emitting element 131 may emit light, and the light-receiving element 133 may detect light that is emitted from the light-emitting element 131, reflected by an object, and then incident on the light-receiving element 133. To this end, the light-emitting element 131 may include a light-emitting diode (LED), and the light-receiving element 133 may include a photodiode (PD). Preferably, the light-emitting element 131 may be an IR LED emitting infrared rays. If the light-emitting element 131 is an IR LED, a visual discomfort may be prevented when the user views the display unit 110 when particularly considering the formation direction and shape of the sensing field.

The position detection apparatus 100 may continuously and simultaneously operate the light-emitting elements 131 provided in the respective sensor arrays SA or operate only some (e.g., one) light-emitting elements 131 at one moment through a time division method. In the case of using a time division method, power for sensing may be reduced, and light interference caused by simultaneous light emission of adjacent light-emitting elements 131 may be reduced.

Meanwhile, the number of sensor arrays SA may be the same as or different from the number of the sensing regions. For example, in the case where the sensing field is divided into 12 regions along the second-axis direction, 12 sensor arrays SA may be used such that one sensor array SA corresponds to one region. As another example, as shown in FIG. 3, the light-emitting area of each sensor array SA may at least partially overlap the light-emitting area of a sensor array SA adjacent thereto so that the sensor arrays SA fewer than the regions of the sensing field may be used. In this case, the sensing area may provide regions more than the sensor arrays SA by comprehensively determining the relative intensity of the light detected by the respective light-receiving elements 133 of the plurality of sensor arrays SA.

Figure 4:
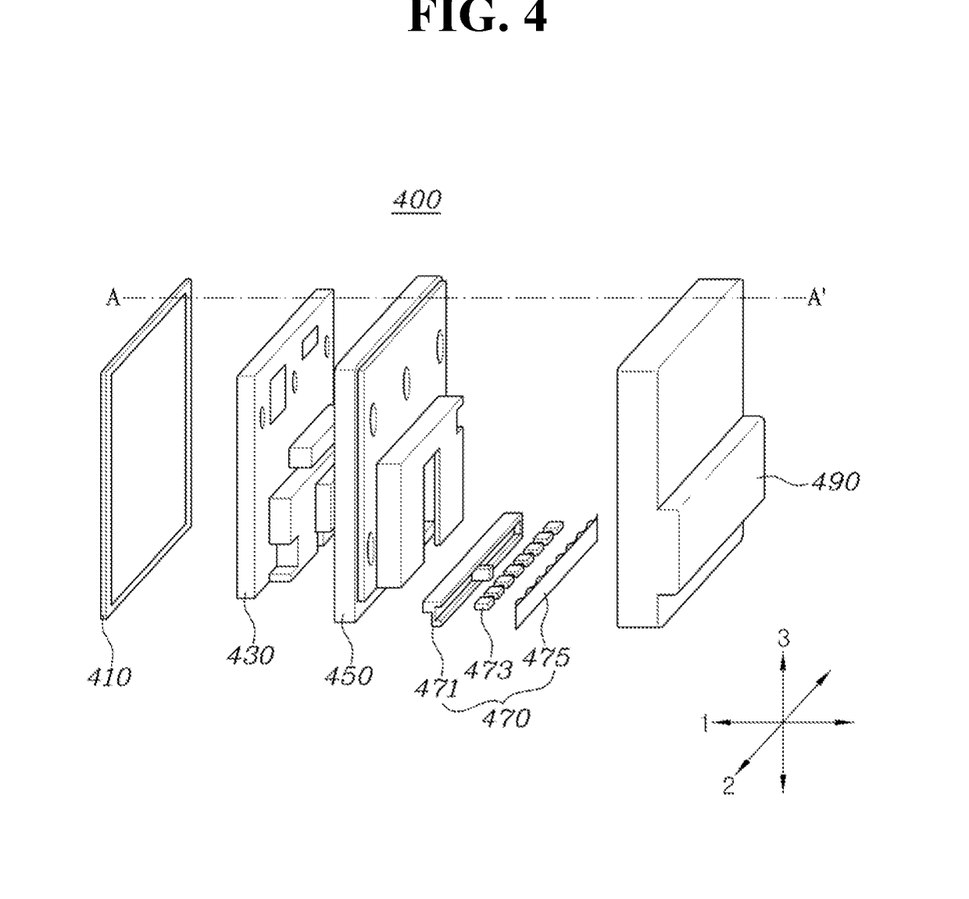
FIG. 4 is an exploded perspective view illustrating an example of an internal structure of a proximity sensor constituting the linear sensor module in FIG. 3.
Figure 5:
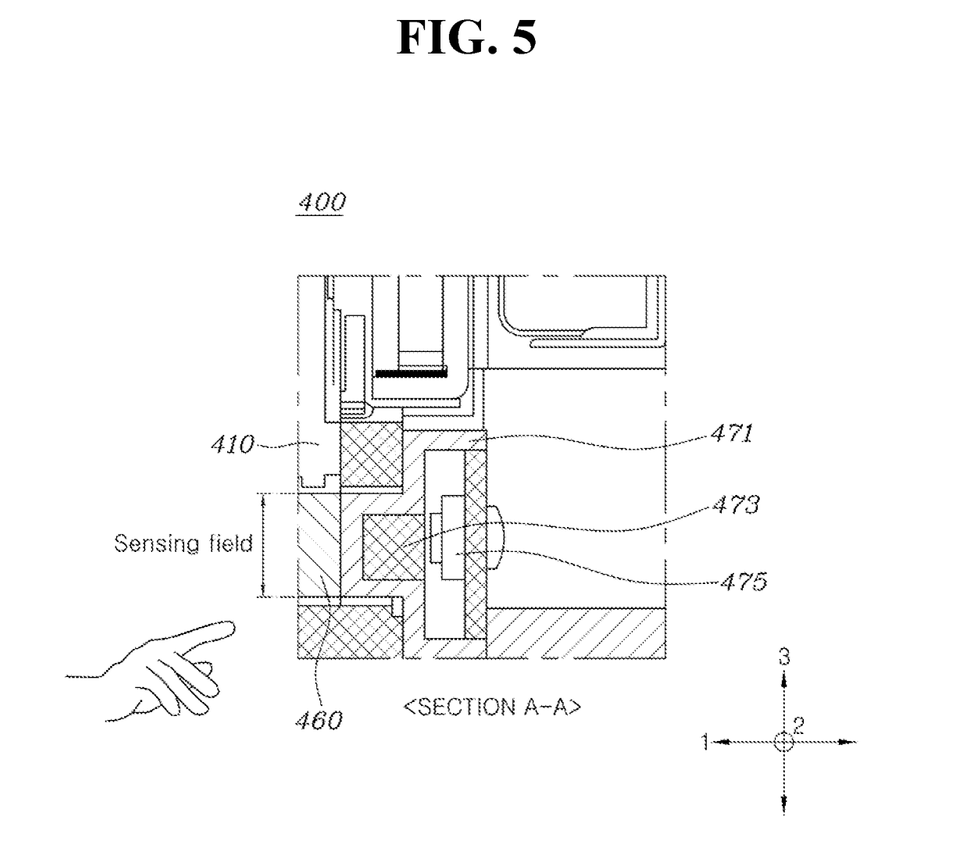
FIG. 5 illustrates an example of a cross-section taken along line A-A' in FIG. 4.

FIG. 4 is an exploded perspective view of a position detection apparatus 400 according to an embodiment of the present disclosure, and FIG. 5 illustrates an example of a cross-section taken along line A-A' in FIG. 4.

Referring to FIGS. 4 and 5, a position detection apparatus 400 according to an embodiment of the present disclosure includes a cover glass member 410, a liquid crystal display 430, a panel 450, a proximity module 470, and a rear cover 490.

The cover glass member 410 is located at the frontmost portion of the position detection apparatus and protects the liquid crystal display 430 from external impact, which is made of a transparent material so as to transmit the information displayed on the liquid crystal display 430 therethrough.

The liquid crystal display 430 corresponds to one embodiment of the aforementioned display unit 110 and is disposed inside the cover glass member 410 to display information on the screen. For example, the liquid crystal display 430 may be a display screen of an audio, video, and navigation (AVN) system disposed between a driver's seat and a passenger seat in a vehicle. For example, the liquid crystal display 430 may display a navigation screen for providing direction to a driver in a vehicle. At this time, the liquid crystal display 430 may be a touch screen capable of detecting a contact position where a user's finger touches.

The panel 450 is located on the rear side of the liquid crystal display 430 and forms a space in which the liquid crystal display 430 may be tightly accommodated so as to protect the same from external impact.

In this case, the panel 450 may be disposed to protrude forward from the housing 471 so as to be flat with respect to the cover glass member 410 when viewed from the front of the position detection apparatus 400 in order to protect the proximity module 470 disposed under the liquid crystal display 430.

The proximity module 470 is located between the panel 450 and the rear cover 490, includes a housing 471, a prism 473, and a printed circuit board 475, and corresponds to the linear sensor 130 described above. A sensor cover 460 may be disposed in front of the housing 471, and the front surface of the sensor cover 460 may be aligned with the front surface of the cover class 410 so as to give a sense of unity with the cover glass member 410. The sensor cover 460 may be configured as a light-transmitting material such as polycarbonate (PC), but this is exemplary, and the sensor cover 460 is not necessarily limited thereto.

The housing 471 provides a space in which the prism 473 and the printed circuit board 475 may be accommodated.

The prism 473 causes, using a light refraction phenomenon, the light emitted from the light-emitting element mounted on the printed circuit board 475 to be reflected by an external object and return to the light-receiving element.

The printed circuit board 475 has at least one light-emitting element for emitting light and at least one light-receiving element for receiving light reflected by an object, which are mounted thereon, in order to detect an object located in front of the position detection apparatus 400.

The rear cover 490 protects the rear surface of the position detection apparatus 400 from external impact.

Although the cover glass member 410 and the sensor cover 460 are shown as separate objects in FIGS. 4 and 5, the cover glass member 410 may extend downward to replace the sensor cover 460 according to another implementation.

Figure 6:
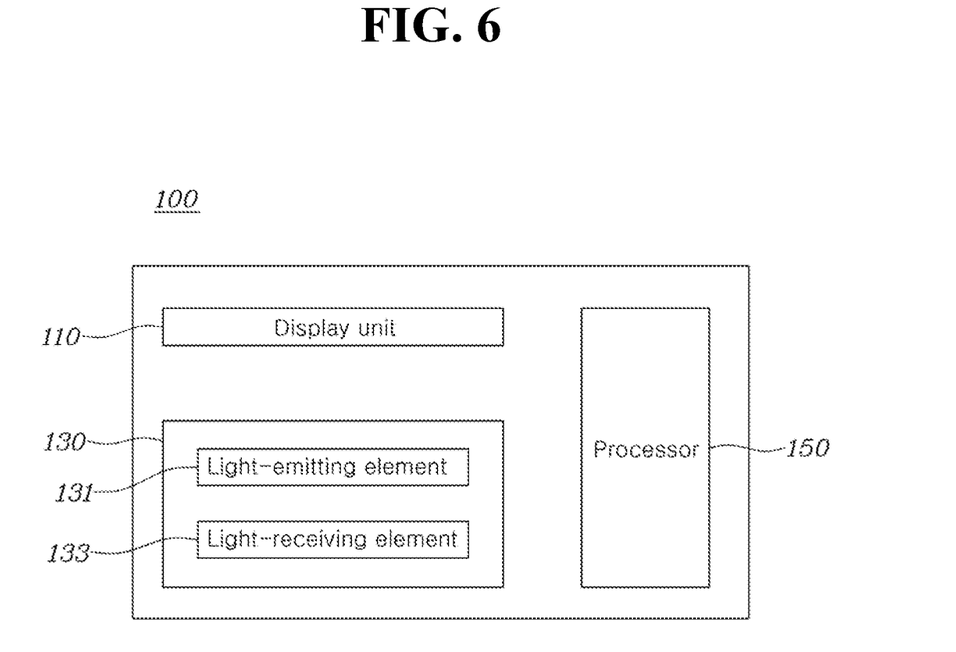
FIG. 6 is a block diagram illustrating the configuration of a position detection apparatus according to an embodiment of the present disclosure.

FIG. 6 is a block diagram illustrating the configuration of a position detection apparatus 100 according to an embodiment of the present disclosure.

Referring to FIG. 6, the position detection apparatus 100 according to the present embodiment may include a display unit 110, a position detection sensor 130, and a processor 150. FIG. 6 shows primary elements related to an embodiment of the present disclosure, and the position detection apparatus 100 may include more elements than that.

Since the configurations and functions of the display unit 110 and the linear sensor 130 have been described above, redundant descriptions thereof will be omitted and the functions of the processor 150 will be described below.

In particular, the processor 150 may receive a light detection signal of the light-receiving element from the linear sensor 130, determine in which region/area of the sensing field a finger is detected based on this, and control the display unit 110 on the basis of this. For example, the processor 150 may detect which region/area of the sensing field a finger approaching the display unit 110 belongs to and cause a detailed menu pops up or display information corresponding thereto.

The processor 150 may control overall operations of the position detection apparatus 100 in addition to the operation related to object detection in the sensing field described above. For example, the processor 150 may process signals, data, information, etc. input or output through the elements described above, or execute application programs stored in a memory (not shown), thereby providing appropriate information or functions to a user or processing the same.

In addition, the processor 150 may control at least some of the elements described above in order to drive application programs stored in the memory. Furthermore, the processor 150 may combine and operate two or more of the elements included in the position detection apparatus 100 in order to drive application programs.

Figure 7:
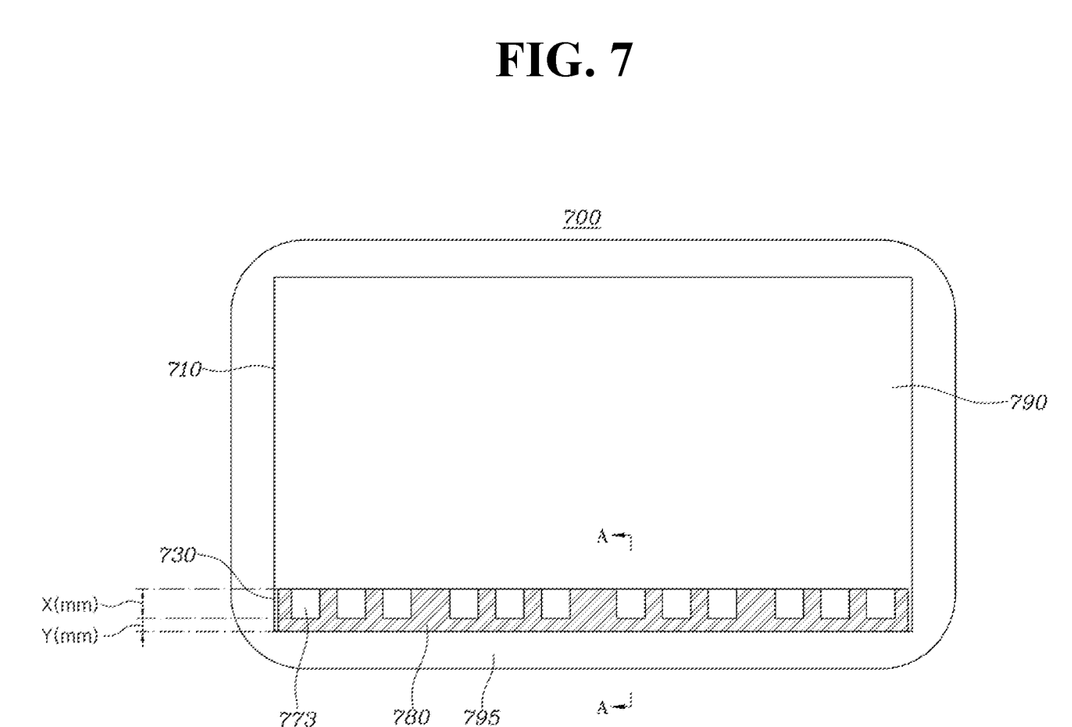
FIG. 7 illustrates a position detection apparatus according to another embodiment of the present disclosure.
Figure 8:
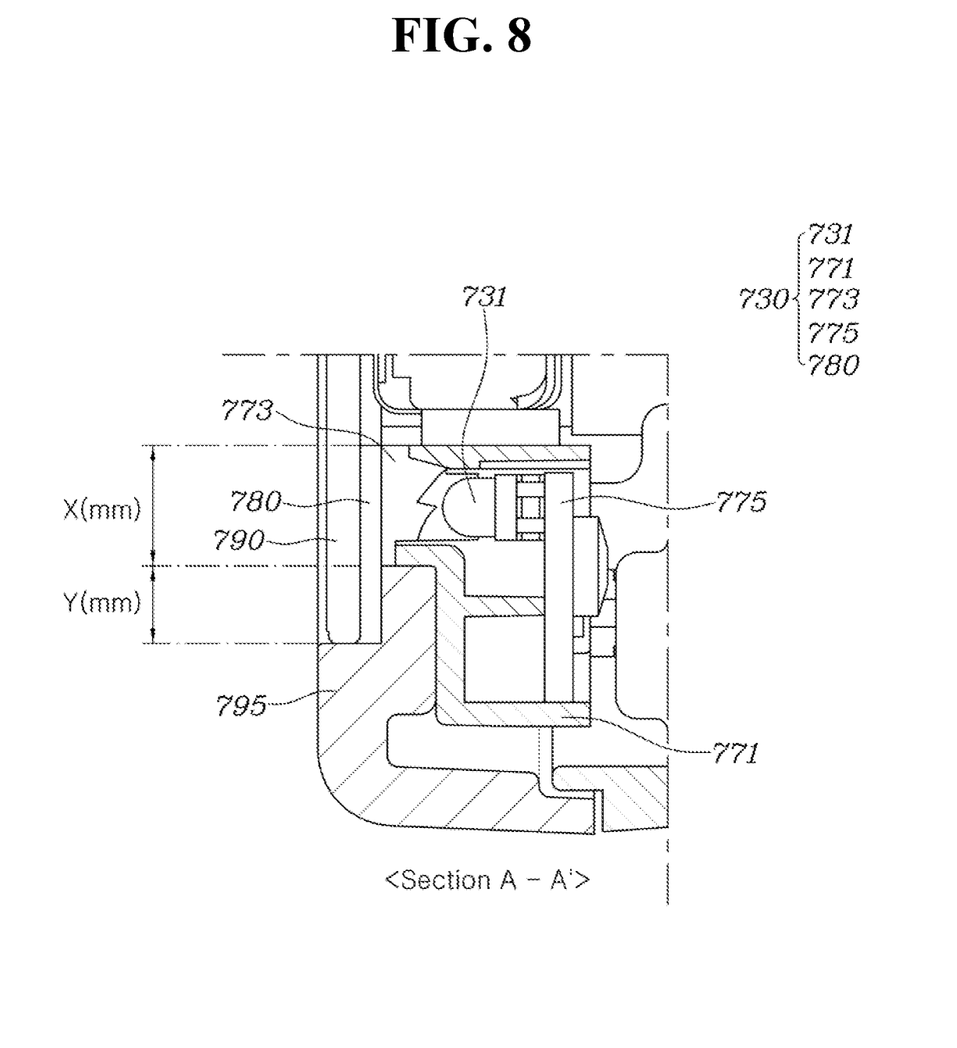
FIG. 8 illustrates an example of a cross-section taken along line A-A' in FIG. 7.

FIG. 7 illustrates a position detection apparatus according to another embodiment of the present disclosure, and FIG. 8 illustrates an example of a cross-section taken along line A-A' in FIG. 7.

Referring to FIGS. 7 and 8, a position detection apparatus 700 according to the embodiment may include a display unit 710, a sensor unit 730, a cover glass member 790, and a panel 795.

The display unit 710 displays information on a screen. In this case, the display unit 710 may be a display having the same structure as the display unit 110 in the embodiment shown in FIG. 1.

The sensor unit 730 extends along one direction in which the display unit 710 extends (here, the second-axis direction) and is disposed side by side with the display unit 710 to detect an object approaching the display unit 710, the position and movement thereof, and the like.

The sensor unit 730 includes an element 731, a housing 771, a lens or lenses 773, a printed circuit board 775, and an adhesive 780.

The element 731 may be one of a light-emitting element and a light-receiving element, and may be, for example, one of either a light-emitting element or a light-receiving element constituting an arrangement pattern in which the light-emitting element is disposed in the center and in which the light-receiving elements are disposed on both sides of the light-emitting element as the sensor array SA shown in FIG. 3.

The housing 771 provides a storage space at which the lens 773 and the printed circuit board 775 are disposed.

The lens 773 causes, using refraction of light, the light emitted from the light-emitting element mounted on the printed circuit board 775 to be reflected by an external object and return to the light-receiving element.

In this case, as many lenses 773 as the number of elements 731 may be disposed on a movement path of a reference light emitted from the element 731 or a reflection light incident on the element 731.

The printed circuit board 775 has at least one element 731 mounted thereon to detect an object located in front of the position detection apparatus 700.

The adhesive 780 provides adhesion between and conjoins the cover glass member 790 and the sensor unit 730.

In this case, the adhesive 780 may be provided to cover all or some of the spaces between the respective lenses 773.

In addition, the adhesive 780 may be provided to cover a portion of the panel 795 exposed below the lens 773.

Referring to FIG. 7, if the vertical length of the lens 773 is X mm, the adhesive 780 may be provided to the remaining area of a rectangle having a vertical length of X+Y mm greater than the lens 773, excluding the area of the lens 773. For example, the vertical length of the lens 773 may be 5 mm, and the vertical length of the adhesive 780 may be 7 mm, which is greater than 5 mm.

In this case, the adhesive 780 may be made of various materials providing adhesion, and for example, the adhesive 780 may be a double-sided tape.

Meanwhile, the adhesive 780 may be a double-sided tape made of a transparent material through which light may pass, and in this case, the adhesive 780 may be provided to the entire area of a rectangle having a vertical length of X+Y mm.

The cover glass member 790 is formed to cover the front of the display unit 710 and the sensor unit 730, thereby protecting the display unit 710 and the sensor unit 730 from external impact.

In this case, the cover glass member 790 may extend downward from the display unit 710 to cover the entirety of the lens 773 and the adhesive 780.

For example, the cover glass member 790 may extend to cover the entire area of a rectangle having a vertical length of X+Y mm.

In this case, the cover glass member 790 may be made of a transparent material to transmit light emitted from or incident on the element 731.

The panel 795 forms a space in which the display unit 710 and the sensor unit 730 may be tightly accommodated so as to receive the sensor unit 730 and protect the same from external impact.

In this case, the panel 795 may be disposed to protrude forward from the housing 771 so as to look flat with the cover glass member 790 when viewed from the front of the position detection apparatus 700 in order to protect the sensor unit 730.

In this case, the cover glass member 790 may extend to the bottom of the lens 773 to cover a portion of the panel 795, and a step may be formed on the panel 795 such that the extending surface of the cover glass member 790 engages with the panel 795.

In this case, the adhesive 780 may be disposed on a contact surface between the cover glass member 790 and the panel 795 to provide a contact force between the cover glass member 790 and the panel 795.

Figure 9:
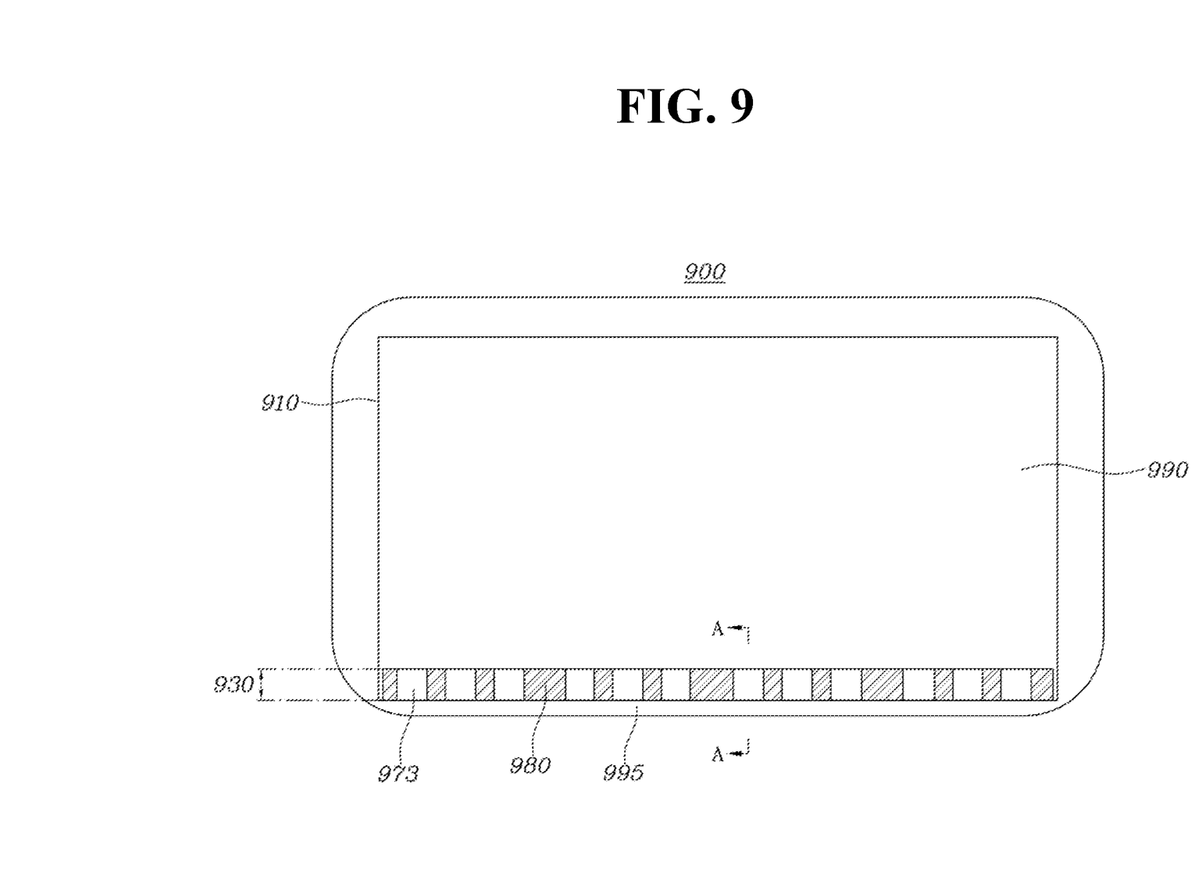
FIG. 9 illustrates a position detection apparatus according to another embodiment of the present disclosure.
Figure 10:
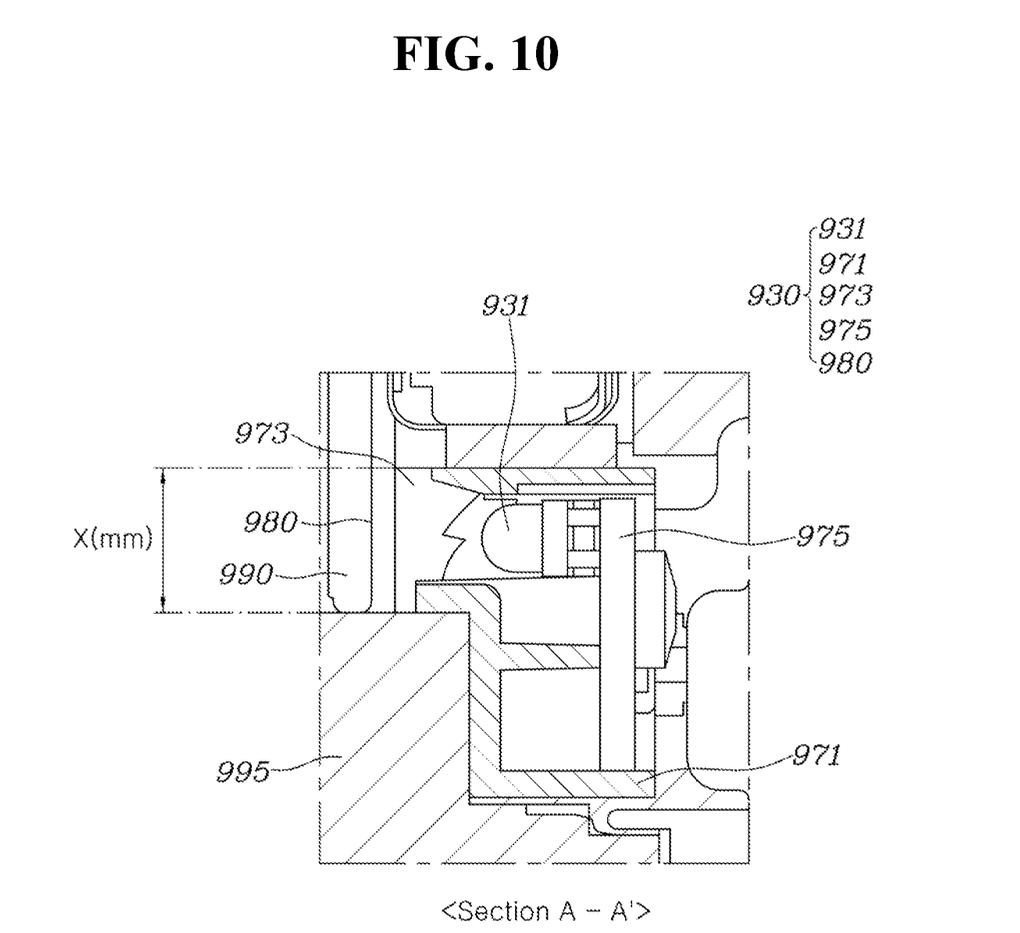
FIG. 10 illustrates another example of a cross-section taken along line A-A' in FIG. 9.

FIG. 9 illustrates a position detection apparatus according to another embodiment of the present disclosure, and FIG. 10 illustrates another example of a cross-section taken along line A-A' in FIG. 9.

Referring to FIGS. 9 and 10, a position detection apparatus 900 according to the embodiment may include a display unit 910, a sensor unit 930, a cover glass member 990, and a panel 995.

The display unit 910 displays information on a screen. In this case, the display unit 910 may be a display having the same structure as the display unit 110 in the embodiment shown in FIG. 1.

The sensor unit 930 extends along one direction in which the display unit 910 extends (here, the second-axis direction) and is disposed side by side with the display unit 910 to detect an object approaching the display unit 910, the position and movement thereof, and the like.

The sensor unit 930 includes an element 931, a housing 971, a lens 973, a printed circuit board 975, and an adhesive 980.

The element 931 may be one of a light-emitting element and a light-receiving element, and may be, for example, one of either a light-emitting element or a light-receiving element constituting an arrangement pattern in which the light-emitting element is disposed in the center and in which the light-receiving elements are disposed on both sides of the light-emitting element as the sensor array SA shown in FIG. 3.

The housing 971 provides a space in which the lens 973 and the printed circuit board 975 are able to be accommodated.

The lens 973 causes, using refraction of light, the light emitted from the light-emitting element mounted on the printed circuit board 975 to be reflected by an external object and return to the light-receiving element.

In this case, as many lenses 973 as the number of elements 931 may be disposed on a movement path of light emitted from the element 931 or incident on the element 931.

The printed circuit board 975 has at least one element 931 mounted thereon to detect an object located in front of the position detection apparatus 900.

The adhesive 980 provides adhesion between the cover glass member 990 and the sensor unit 930.

In this case, unlike the embodiment in FIGS. 7 and 8, the adhesive 980 may be provided to cover only some or all of the spaces between the respective lenses 973.

Referring to FIG. 9, if the vertical length of the lens 973 is X mm, the adhesive 980 may be provided to the remaining area of a rectangle having a vertical length of X mm, excluding the area of the lens 973. For example, the vertical lengths of both the lens 973 and the adhesive 980 may be 5 mm.

In this case, the adhesive 980 may be made of various materials providing adhesion, and for example, the adhesive 980 may be a double-sided tape.

Meanwhile, the adhesive 980 may be a double-sided tape made of a transparent material through which light may pass, and in this case, the adhesive 980 may be provided to the entire area of a rectangle having a vertical length of X mm.

The cover glass member 990 is formed to cover the front of the display unit 910 and the sensor unit 930, thereby protecting the display unit 910 and the sensor unit 930 from external impact.

In this case, the cover glass member 990 may extend downward from the display unit 910 to cover the entirety of the lens 973 and the adhesive 980.

In this case, the cover glass member 990 may extend to cover the entire area of a rectangle having a vertical length of X mm.

In this case, the cover glass member 990 may be made of a transparent material to transmit light emitted from or incident on the element 931.

The panel 995 forms a space in which the display unit 910 and the sensor unit 930 may be tightly accommodated so as to receive the sensor unit 930 and protect the same from external impact.

In this case, the panel 995 may be disposed to protrude forward from the housing 971 so as to look flat with the cover glass member 990 when viewed from the front of the position detection apparatus 900 in order to protect the sensor unit 930.

According to the embodiments of the present disclosure described above, even if the display cover glass member is configured to extend downward to cover an optical sensor, it is possible to protect the sensor at the bottom of the display while minimizing an increase in the size of the cover glass member.

In addition, it is possible to secure the rigidity of a proximity sensor module by replacing an assembly screw with a double-sided tape.

In addition, it is possible to provide a sense of unity with an upper display screen in appearance.

In addition, it is possible to secure luxurious design.

What is claimed is:

1. A position detection apparatus comprising:
   a display unit having a screen configured to display information;
   a sensor unit located below the display unit and configured to detect a position of an object approaching the screen; and
   a cover glass member covering a front side of the display unit and sensor unit,
   wherein the sensor unit comprises:
      one or more light-emitting elements configured to emit reference light;
      one or more light-receiving elements configured to receive the reference light emitted by the one or more light-emitting elements and reflected by the object;
      a plurality of lenses disposed between the cover glass and the one or more light-emitting elements; and
      an adhesive in contact with the cover glass member and covering a front side of the sensor unit.

2. The position detection apparatus of claim 1, wherein the plurality of lenses are configured to refract (1) the reference light emitted from the one or more light-emitting elements and (2) the reference light reflected by the object toward the one or more light-receiving elements.

3. The position detection apparatus of claim 2, wherein the cover glass member extends downward from the display unit and covers an entirety of the plurality of lenses and adhesive.

4. The position detection apparatus of claim 3, wherein a number of the plurality of lenses disposed on a movement path of the reference light and the reflected reference light is identical to a number of the one or more light-emitting elements and a number of the one or more light-receiving elements disposed on the movement path of the reference light and the reflected reference light.

5. The position detection apparatus of claim 4, where and the adhesive at least partially occupies a space between the plurality of lenses.

6. The position detection apparatus of claim 4, wherein the adhesive comprises a transparent material and entirely covers the plurality of lenses.

7. The position detection apparatus of claim 1, further comprising a panel having a storage space at which the display unit and the sensor unit are disposed.

8. The position detection apparatus of claim 7, wherein the panel protrudes to be flat with respect to the cover glass member.

9. The position detection apparatus of claim 8, wherein the cover glass member extends vertically and has a size covering only the plurality of lenses.

10. The position detection apparatus of claim 8, wherein the cover glass member has a surface extending below the plurality of lenses and covering a portion of the panel.

11. The position detection apparatus of claim 10, wherein the panel has a step that is shaped to engage the extending surface of the cover glass member to collectively form a flat surface.

12. The position detection apparatus of claim 7, wherein the adhesive covers a contact surface between the cover glass member and the panel.

13. The position detection apparatus of claim 1, wherein the adhesive comprises a double-sided tape.

14. The position detection apparatus of claim 1, wherein the cover glass member comprises a transparent material.

* * * * *